United States Patent
Oh et al.

(10) Patent No.: US 11,930,492 B2
(45) Date of Patent: Mar. 12, 2024

(54) METHOD AND APPARATUS FOR TRANSMISSION OF UPLINK CONTROL INFORMATION IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Min Jang, Gyeonggi-do (KR); Younsun Kim, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 252 days.

(21) Appl. No.: 17/545,537

(22) Filed: Dec. 8, 2021

(65) Prior Publication Data
US 2022/0183034 A1    Jun. 9, 2022

(30) Foreign Application Priority Data

Dec. 9, 2020   (KR) .................. 10-2020-0171728
Dec. 14, 2020  (KR) .................. 10-2020-0174791

(51) Int. Cl.
*H04L 5/00*       (2006.01)
*H04W 72/1268*    (2023.01)
*H04W 72/23*      (2023.01)

(52) U.S. Cl.
CPC ....... *H04W 72/1268* (2013.01); *H04L 5/0057* (2013.01); *H04W 72/23* (2023.01)

(58) Field of Classification Search
CPC .. H04W 72/1268; H04W 72/23; H04L 5/0057
USPC ........................................... 370/329
See application file for complete search history.

(56) References Cited

U.S. PATENT DOCUMENTS

| | | | |
|---|---|---|---|
| 11,659,592 B2 * | 5/2023 | Talarico | H04L 1/1887 370/329 |
| 2019/0289635 A1 | 9/2019 | Wang et al. | |
| 2020/0295892 A1 | 9/2020 | Oh et al. | |

FOREIGN PATENT DOCUMENTS

| | | |
|---|---|---|
| EP | 3 512 287 | 7/2019 |
| WO | WO 2017/099860 | 6/2017 |

OTHER PUBLICATIONS

3GPP, 3rd Generation Partnership Project; Technical Specification Group Radio Access Network; Evolved Universal Terrestrial Radio Access (E-UTRA); Multiplexing and Channel Coding (Release 16), 3GPP TS 36.212 V16.3.0, Sep. 2020, 253 Pages.

(Continued)

*Primary Examiner* — Christopher R Crompton
(74) *Attorney, Agent, or Firm* — The Farrell Law Firm, P.C.

(57) ABSTRACT

The disclosure relates to a communication technique for combining an IoT technology with a 5G communication system for supporting a higher data transmission rate than that of a beyond-4G system, and a system therefor. The disclosure may be applied to intelligent services (for example, smart homes, smart buildings, smart cities, smart cars or connected cars, health care, digital education, retail businesses, security and safety related services, and the like) based on 5G communication technologies and IoT-related technologies. In addition, the disclosure provides a method and apparatus for power control of an IAB node in a wireless communication system.

20 Claims, 10 Drawing Sheets

| Physical symbol index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Slot index | 0 | | | | | | | 1 | | | | | | |
| Symbol config. | PUSCH | PUSCH | PUSCH | DMRS | PUSCH | PUSCH | PUSCH | PUSCH | PUSCH | PUSCH | DMRS | PUSCH | PUSCH | x |
| PUSCH symbol index | 0 | 1 | 2 | | 3 | 4 | 5 | 6 | 7 | 8 | | 9 | 10 | 11 |
| UL-SCH mapping | | | | | | | | | | | | | | |
| UCI mapping | | | | | | | | | | | | | | |

(56) References Cited

OTHER PUBLICATIONS

3GPP, 3rd Generation Partnership Project; Technical Specification Group Radio Access Network; Physical Layer Procedures for shared Spectrum Channel Access, (Release 16), 3GPP TS 37.213 V16.3.0, Sep. 2020, 26 pages.
International Search Report dated Mar. 10, 2022 issued in counterpart application No. PCT/KR2021/018495, 7 pages.

* cited by examiner

FIG. 1G

| Physical symbol index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Slot index | 0 | | | | | | | 1 | | | | | | |
| Symbol config. | PUSCH | PUSCH | PUSCH | DMRS | PUSCH | PUSCH | PUSCH | PUSCH | PUSCH | PUSCH | DMRS | PUSCH | PUSCH | x |
| PUSCH symbol index | 0 | 1 | 2 | | 3 | 4 | 5 | 6 | 7 | 8 | | 9 | 10 | 11 |
| UL-SCH mapping | | | | | | | | | | | | | | |
| UCI mapping | | | | | | | 2 | | | | | | | |

Uplink subframe

METHOD AND APPARATUS FOR TRANSMISSION OF UPLINK CONTROL INFORMATION IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2020-0171728, and 10-2020-0174791, filed on Dec. 9, 2020, and Dec. 14, 2020, respectively, in the Korean Intellectual Property Office, the disclosure of each of which is incorporated herein by reference in its entirety.

BACKGROUND

1. Field

The disclosure relates to a method and an apparatus for transmitting uplink control information through an uplink data channel in a wireless communication system that operates in an unlicensed band. More particularly, the disclosure relates to a method for transmitting uplink control information when an uplink data channel transmission symbol is changed according to a result of an uplink channel access procedure of a user equipment (UE).

2. Description of Related Art

To meet the increased demand for wireless data traffic since deployment of 4G communication systems, efforts have been made to develop an improved 5G or pre-5G communication system. Therefore, the 5G or pre-5G communication system is also called a "beyond 4G network" communication system or a "Post long term evolution (LTE)" system. The 5G communication system is considered to be implemented in higher frequency (mmWave) bands (e.g., 60 GHz bands) so as to accomplish higher data rates. To decrease propagation loss of the radio waves and increase the transmission distance, beamforming, massive multiple-input multiple-output (mMIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, hybrid frequency shift keying (FSK) and quadrature amplitude modulation (FQAM), and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of convergence of the 5G technology with the IoT technology.

SUMMARY

A method is provided, wherein, when uplink control information is transmitted through an uplink data channel in a wireless communication system that operates in an unlicensed band, and when an uplink data channel transmission symbol is changed according to a result of an uplink channel access procedure of a UE, uplink control information is transmitted through the second slot of a subframe through which the uplink data channel is transmitted all the time, thereby transmitting the uplink control information more efficiently.

In accordance with an aspect of the disclosure, a method performed by a terminal in a communication system is provided. The method includes receiving, from a base station, downlink control information (DCI) scheduling a physical uplink shared channel (PUSCH) in a licensed-assisted access (LAA) cell; identifying that the PUSCH is associated with a partial PUSCH mode; and transmitting, to the base station, the PUSCH including channel quality information (CQI) in a subframe, the CQI being transmitted only on a second slot of the subframe, wherein the CQI is mapped to a symbol in the second slot of the subframe based on a first parameter associated with a number of symbols in an uplink slot and a second parameter associated with a starting position of the PUSCH in the subframe.

In accordance with another aspect of the disclosure, a terminal in a communication system is provided. The terminal includes a transceiver; and a processor configured to receive, from a base station, downlink control information (DCI) scheduling a physical uplink shared channel (PUSCH) in a licensed-assisted access (LAA) cell; identify that the PUSCH is associated with a partial PUSCH mode; and transmit, to the base station, the PUSCH including channel quality information (CQI) in a subframe, the CQI being transmitted only on a second slot of the subframe, wherein the CQI is mapped to a symbol in the second slot of the subframe based on a first parameter associated with a number of symbols in an uplink slot and a second parameter associated with a starting position of the PUSCH in the subframe.

In accordance with another aspect of the disclosure, a method performed by a base station in a communication system is provided. The method includes transmitting, to a terminal, downlink control information (DCI) scheduling a physical uplink shared channel (PUSCH) in a licensed-assisted access (LAA) cell; and receiving, from the terminal, the PUSCH associated with a partial PUSCH mode and including channel quality information (CQI) in a subframe, the CQI being received only on a second slot of the subframe, wherein the CQI is mapped to a symbol in the second slot of the subframe based on a first parameter associated with a number of symbols in an uplink slot and a second parameter associated with a starting position of the PUSCH in the subframe.

In accordance with another aspect of the disclosure, a base station in a communication system in provided. The base station includes a transceiver; and a processor configured to transmit, to a terminal, downlink control information (DCI) scheduling a physical uplink shared channel (PUSCH) in a licensed-assisted access (LAA) cell; and receive, from the terminal, the PUSCH associated with a partial PUSCH mode and including channel quality information (CQI) in a subframe, the CQI being received only on a second slot of the subframe, wherein the CQI is mapped to a symbol in the second slot of the subframe based on a first parameter associated with a number of symbols in an uplink slot and a second parameter associated with a starting position of the PUSCH in the subframe.

Uplink control information of a UE may be transmitted within the second slot of a subframe through which an uplink data channel is transmitted, thereby transmitting the uplink control information more efficiently.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1G illustrates a case in which UCI information is mapped to a first slot of a PUSCH transmission subframe;

DETAILED DESCRIPTION

Figure 1A:
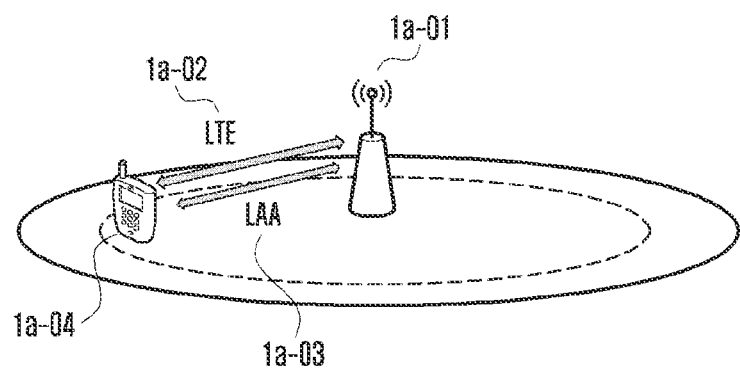
FIG. 1A illustrates a communication system to which the disclosure is applied.

Recently, the mobile communication system is evolving into a high-speed, high-quality wireless packet data communication system for providing data service and multimedia service, instead of providing an initial voice-oriented service. In order to support such high-speed, high-quality wireless packet data transmission service, various mobile communication standards such as high-speed downlink packet access (HSDPA), high-speed uplink packet access (HSUPA), LTE, and LTE advanced (LTE-A) of 3rd generation partnership project (3GPP), high-rate packet data (HRPD) of 3GPP2, and 802.16 from Institute of Electrical and Electronics Engineers (IEEE) have been developed. In particular, LTE/LTE-A/LTE-A-Pro (hereinafter, referred to as LTE) continues to develop and evolve standards to improve system capacity and frequency efficiency. Representatively, in LTE systems, data rate and system capacity may be greatly increased according to available frequency bandwidth by using carrier aggregation (CA), which can operate a system using multiple frequency bands. However, the frequency band in which the LTE system is currently operating is a licensed spectrum (or licensed carrier) that a specific operator has its own authority and can use exclusively. In general, in a case of a frequency band providing a mobile communication service (for example, a frequency band of 5 GHz or less), it is difficult for a mobile communication service provider to secure a plurality of licensed band frequencies because other operators or other communication systems are already using the same.

Therefore, in order to efficiently handle the explosive increase of mobile data in such a difficult environment to secure the licensed band frequency, a technology for utilizing an LTE system in an unlicensed spectrum (or unlicensed carrier) has recently been studied (for example, LTE in unlicensed (LTE-U), licensed-assisted access (LAA). An unlicensed band is a technology in which a specific operator or a specific system does not exclusively use a specific band, but all allowable communication devices share the same frequency band. Here, for example, the 5 GHz band of the unlicensed band is one of the unlicensed frequency bands that is easy to secure additional frequency bands because it is used by a relatively small number of communication devices and utilizes a very wide bandwidth compared to the 2.4 GHz unlicensed band. In other words, the system capacity can be easily increased when the licensed band and the unlicensed band frequency are utilized by using an LTE technology that integrates a plurality of frequency bands, that is, a CA technology. That is, an LTE cell in the licensed band is configured as a primary cell (or Pcell) and an LTE cell (LAA cell or LTE-U cell) in the unlicensed band is configured as a secondary cell (Scell or LAA SCell) to operate the LTE system in the licensed band and the unlicensed band by using the CA technology. Here, the system may be applied to CA in which the licensed band and the unlicensed band are connected by ideal backhaul and a dual connectivity environment in which the licensed band the unlicensed band are connected by non-ideal backhaul. The disclosure will be described assuming a CA environment in which an ideal backhaul is connected between a licensed band and an unlicensed band.

Figure 1B:
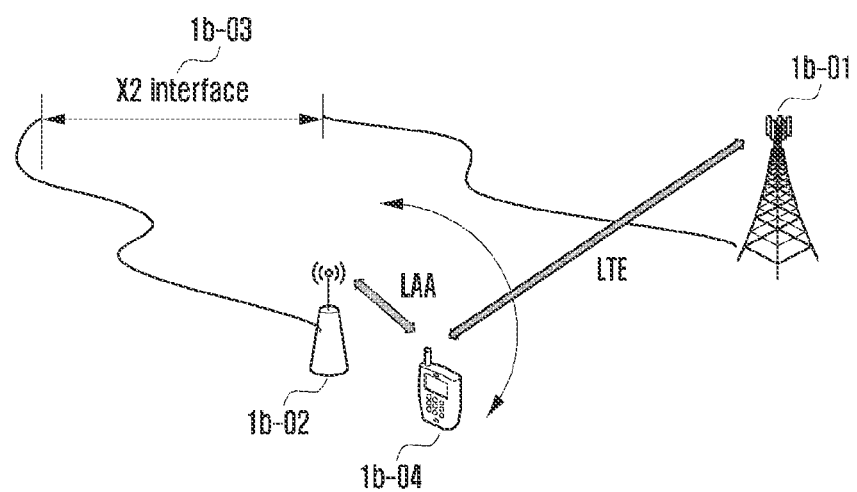
FIG. 1B illustrates a communication system to which the disclosure is applied.

FIG. 1A and FIG. 1B illustrate a communication system to which the disclosure is applied.

Referring to FIGS. 1A and 1B, FIG. 1A illustrates a case in which an LTE cell 1a-02 and an LAA cell 1a-03 coexist in one small base station 1a-01 in a network, and a terminal 1a-04 performs data transmission or reception to or from the base station 1a-01 through the LTE cell 1a-02 and the LAA cell 1a-03. There is no restriction on the duplex scheme of the LTE cell 1a-02 or the LAA cell 1a-03, and a cell performing a data transmission/reception operation using a licensed band may be assumed to be the LTE cell 1a-02 or PCell and a cell performing the data transmission/reception operation using an unlicensed band may be assumed to be the LAA cell 1a-03 or SCell. However, uplink transmission may be limited to be performed only through the LTE cell 1a-02 when the LTE cell is a PCell.

FIG. 1B illustrates that an LTE macro base station 1*b*-01 for wide coverage and an LAA small base station 1*b*-02 for increasing a data transmission amount are installed in a network and here, there is no restriction on a duplex scheme of LTE macro base station 1*b*-01 or LAA small base station 1*b*-02. Here, the LTE macro base station 1*b*-01 may be replaced with the LTE small base station 1*b*-02. Further, the uplink transmission may be configured to perform transmission only through the LTE base station 1*b*-01 when the LTE base station is the PCell. Here, it is assumed that the LTE base station 1*b*-01 and the LAA base station 1*b*-02 have ideal backhaul networks. Therefore, rapid inter-base station X2 communication 1*b*-03 is enabled, and as a result, even though the uplink transmission is transmitted only to the LTE base station 1*b*-01, the LAA base station 1*b*-02 may receive related control information from the LTE base station 1*b*-01 through the X2 communication 1*b*-03 in real time. The schemes suggested by the disclosure are applicable to both the system of FIG. 1A and the system of FIG. 1B.

Figure 1C:
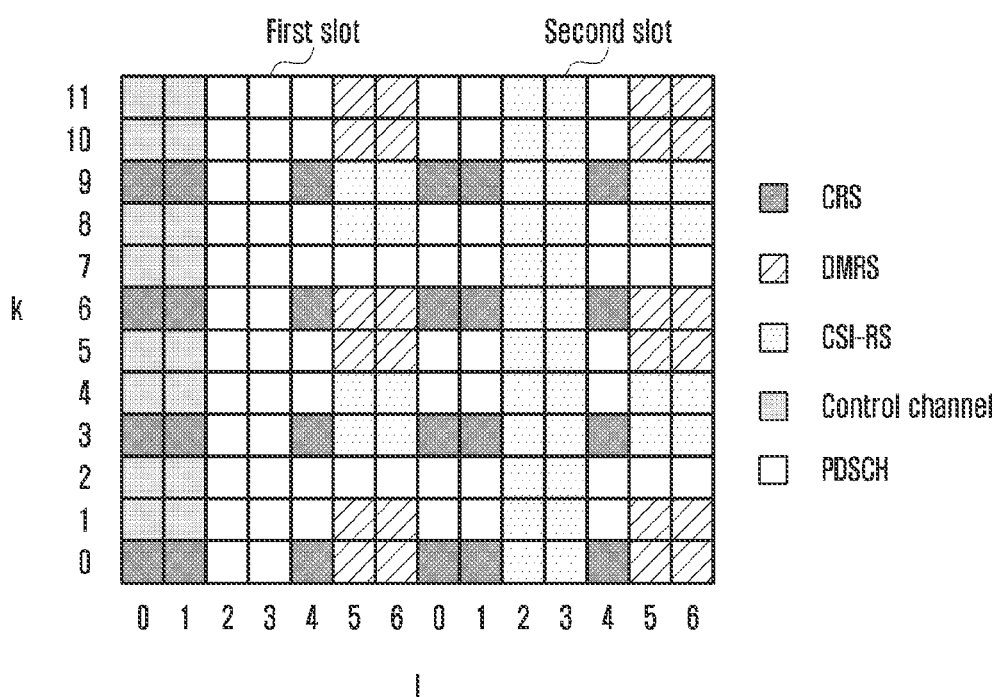
FIG. 1C illustrates a radio resource configuration of an LTE system.

FIG. 1C illustrates a radio resource configuration of an LTE system.

In general, the LTE/LTE-A system is a scheme for transmitting data using an orthogonal frequency division multiplexing (OFDM) transmission scheme. In the OFDM scheme, a modulated signal is located in a two-dimensional resource configured by time and frequency. Resources on the time axis are divided into different OFDM symbols and they are orthogonal to each other. Resources on the frequency axis are divided into different subcarriers or subcarriers, and they are also orthogonal to each other. That is, in the OFDM scheme, if a specific OFDM symbol is designated on the time axis and a specific subcarrier is designated on the frequency axis, one minimum unit resource may be indicated, which is called a resource element (RE). Since different REs are orthogonal to each other even though they pass through a frequency selective channel, signals transmitted to different REs may be received at a receiver without causing mutual interference. In an OFDM communication system, a downlink bandwidth includes a plurality of resource blocks (RBs), and each physical resource block (PRB) includes 12 subcarriers arranged along a frequency axis as shown in FIG. 2, and 7 or 6 OFDM symbols arranged along the time axis. A subframe on the time axis is configured by two slots, that is, a first slot and a second slot of 0.5 msec length as shown in FIG. 2. In the radio resource illustrated in FIG. 2, a plurality of different types of signals may be transmitted as follows.

1. Cell specific RS (CRS): A reference signal (RS) periodically transmitted for all UEs belonging to one cell and may be commonly used by a plurality of UEs.

2. Demodulation reference signal (DMRS): This is a reference signal transmitted for a specific UE and is transmitted only when data is transmitted to the UE. DMRS may be configured by a total of eight DMRS ports. In LTE/LTE-A, port 7 to port 14 correspond to DMRS ports, and each port maintains orthogonality so as not to interfere with each other by using code division multiplexing (CDM) or frequency division multiplexing (FDM).

3. Physical downlink shared channel (PDSCH): This is a data channel through which transmission to downlink is performed and is used by a base station to transmit traffic to a UE. Transmission through the PDSCH is performed using REs via which the reference signal is not transmitted in the data region of FIG. 2.

4. Channel status information reference signal (CSI-RS): A reference signal transmitted for UEs belonging to one cell and used to measure channel status. A plurality of CSI-RSs may be transmitted in one cell. In the LTE-A system, one CSI-RS may correspond to one, two, four, or eight antenna ports.

5. Other control channels (PHICH, PCFICH, and PDCCH): This is used to provide control information required for a UE to receive PDSCH or transmit ACK/NACK for operating HARQ for uplink data transmission.

A physical dedicated control channel (PDCCH) region, which is a control channel region, and an enhanced PDCCH (ePDCCH), which is a data channel region, are divided and transmitted on the time axis. This is for quickly receiving and demodulating control channel signals. In addition, the PDCCH region is located over the entire downlink band, in which one control channel is divided into control channels of a small unit and distributed in the entire downlink band. The uplink is largely divided into a control channel (PUCCH) and a data channel (PUSCH), and a response channel for the downlink data channel and other feedback information are transmitted through the control channel if there is no data channel, and transmitted through the data channel if there is a data channel.

Here, at least one signal of a control signal, a channel, or a data channel may be transmitted and received using some of SC-FDMA or OFDM symbols in an uplink or downlink subframe used for LTE communication. For example, transmission of a control signal, a channel, or a data channel may be performed using a 0-k1 OFDM symbol (where, k1<13) among 14 OFDM symbols (0, 1, 2, . . . , 13 OFDM symbol indexes) configuring a 1 ms subframe. Alternatively, transmission or reception of the control signal, channel, or data channel may be performed using k1 to 13 OFDM symbols (where, k1>0). Here, as described above, a subframe, which performs transmission and reception of the control signal, control channel, or data channel by using some symbols in the subframe, may be expressed as a partial subframe.

Hereinafter, embodiments will be described in detail with reference to the accompanying drawings. In the following description of the disclosure, detailed descriptions of related known functions or configurations will be omitted when it is determined that the detailed description may unnecessarily obscure the subject matter of the disclosure. Terms to be described later are terms defined in consideration of functions in the disclosure, and may be changed according to intentions or customs of users or operators. Therefore, definitions should be made based on the contents throughout the specification. In addition, in the specification, a system for transmitting and receiving signals using at least one unlicensed band in an LTE system, an LTE-A, and an LTE-A-Pro system has been described as an example. The disclosure can be applied without any addition or subtraction in another communication system, which uses a licensed band and an unlicensed band at the same time, or communication systems which perform sensing (or measurement of received signal strength) of a frequency band in which the signal transmission is previously performed and perform a signal transmission or not according to the sensing result.

In the disclosure, for convenience of explanation, it will be described on the assumption that a cell for transmission and reception of a signal using the unlicensed band is configured as an SCell, but can be also applied to a case where a cell operating in the unlicensed band is configured and operated as a PCell or PSCell. In the disclosure, a base station or cell communicating using an unlicensed band can be expressed as an LAA SCell, an LAA cell, an LAA base station, a base station, or a cell, and a terminal communicating using an unlicensed band can be interchangeably expressed as an LAA terminal, an LAA UE, a UE, or the terminal, the meanings expressed in the embodiments described in the disclosure are the same.

In addition, the disclosure will be described assuming only a frequency integration (CA) environment in which at least one licensed band cell and at least one unlicensed band cell are connected by ideal backhaul for convenience of explanation, but is not limited thereto. It is also applicable to a dual-connectivity environment in which cells are connected by non-ideal backhaul or a stand-alone environment in which cells operating only in the unlicensed band without licensed band cells are configured. In addition, the disclosure will be described under the assumption that the LAA terminal transmits uplink control signals or channels, or uplink data by using the unlicensed band to the LAA cell, but the disclosure can also be applied to a case in which the LAA cell transmits downlink control signals or channels, or downlink data by using the unlicensed band to the LAA terminal.

In general, a plurality of devices use an unlicensed band by sharing the same frequency band or channel. Here, the devices using the unlicensed band may be different systems. Accordingly, devices operating in an unlicensed band for mutual coexistence between various devices may perform a channel sensing operation (or channel sensing) for the unlicensed band before performing communication using an unlicensed band or channel, and may perform communication for the unlicensed band or not according to the result of the channel sensing operation. Here, if the unlicensed band is available according to the result of the channel sensing operation, the device may continuously occupy and use the unlicensed band for a predefined or configured maximum channel occupancy time (MCOT).

The general operation of devices operating in the unlicensed band is as follows. A transmitting device that requires signal transmission, including data or control signals, may determine whether other devices occupy (or use) the channel for the unlicensed band or channel for which the signal transmission is performed before performing the signal transmission, and may perform channel occupancy or not according to the determined channel occupancy state of other devices with respect to the channel. This operation is commonly referred to as listen-before-talk (LBT) (or channel sensing operation or channel sensing). In other words, at least a transmitting device that intends to perform communication using an unlicensed band should determine whether the channel occupancy is possible, according to a predefined or established method. Here, the time for the channel detection to determine whether the unlicensed band or channel occupancy is possible can be predefined or configured by a transmitting device or a specific device, and can be selected to a predetermined value within a specific range. In addition, the channel sensing time may be configured in proportion to the maximum channel occupancy time that can continuously occupy the maximum number of unlicensed bands without a separate channel sensing operation. On the other hand, a channel sensing time for performing a channel sensing operation may be configured according to the maximum channel occupation time.

Here, at least one setting value of the channel sensing operation for determining whether the channel occupancy is possible as described above may be configured differently according to the band of the unlicensed frequency performing the operation or according to regional and/or national regulations. For example, in the United States, the 5 GHz frequency band may be used without a separate channel sensing operation in addition to an operation for radar sensing.

The transmitting device that intends to use the unlicensed band may detect whether other devices use the corresponding channel through the channel sensing operation (or LBT) as described above, and if the channel occupancy by other devices is not detected on the channel, the transmitting device may occupy and use the channel. Here, devices using the unlicensed band may operate, after the channel sensing operation, by pre-defining or configuring a maximum channel occupancy time for continuous occupation. The maximum occupiable time may be previously defined according to regulations defined according to frequency bands, regions, and the like. Alternatively, a terminal may be separately configured from another device, for example, a base station. Here, the channel occupancy time may be configured differently according to unlicensed bands or regional or national regulations. For example, in Japan, the maximum occupiable time in the unlicensed band of the 5 GHz band is limited to 4 ms.

In order to use the unlicensed band in the LAA system, a channel occupancy method in an LAA cell is described as follows. If the LAA cell performs a channel sensing operation for the corresponding unlicensed band during a fixed period (for example, 25 $\mu s$), the magnitude of the signal strength received at entire or part of the fixed channel sensing period is greater than a predefined threshold value, the LAA cell determines that the unlicensed band is used by one or more other devices, and does not perform communication using the unlicensed band. If the magnitude of the signal strength received in the entire fixed channel sensing period is less than a predefined threshold value, the LAA cell may determine that the unlicensed band is in an idle state and may continuously use the unlicensed band during the predefined or configured maximum channel occupation period.

When performing a channel sensing operation for a corresponding unlicensed band during a variable period in the LAA cell, if the magnitude of the signal received in some of the configured variable channel sensing period is larger than a predefined threshold value, the LAA cell determines that the unlicensed band is used by one or more other devices and does not perform communication using the unlicensed band. If the magnitude of the signal strength received over the entire variable channel sensing period is less than a predefined threshold value, the LAA cell may determine that the unlicensed band is in an idle state, and may continuously use the unlicensed band during the predefined or configured maximum channel occupation period. Here, the variable channel sensing period may be changed by selecting a random value within a contention window managed or configured by the LAA cell. For example, the transmitting device may select random variable N from among a set of channel contention periods selected based on at least one of a type of a signal to be transmitted in an LAA cell or a maximum channel occupation period to be occupied by an LAA cell (for example, if the maximum initial contention period is 15, select predetermined integer N from (0, 15)), and may perform a channel sensing operation for the selected N period and then occupy and use the unlicensed band. Here, the contention period may be changed or initialized based on a result of reception (for example, ACK/NACK) by the terminal of the data signal transmitted through the unlicensed band, and thus it is possible to lower the probability that other devices may simultaneously use the unlicensed band. For example, when NACK is generated more than 80% as a result of the reception by the terminal of the data signals transmitted in the first subframe of the maximum channel occupancy period through the unlicensed band, the LAA cell increases the contention period. If no NACK is generated more than 80% as a result of the reception by the terminal of the data signals transmitted in the first subframe of the maximum channel occupancy period through the unlicensed band, the LAA cell configures the contention period to be the initial value.

Figure 1D:
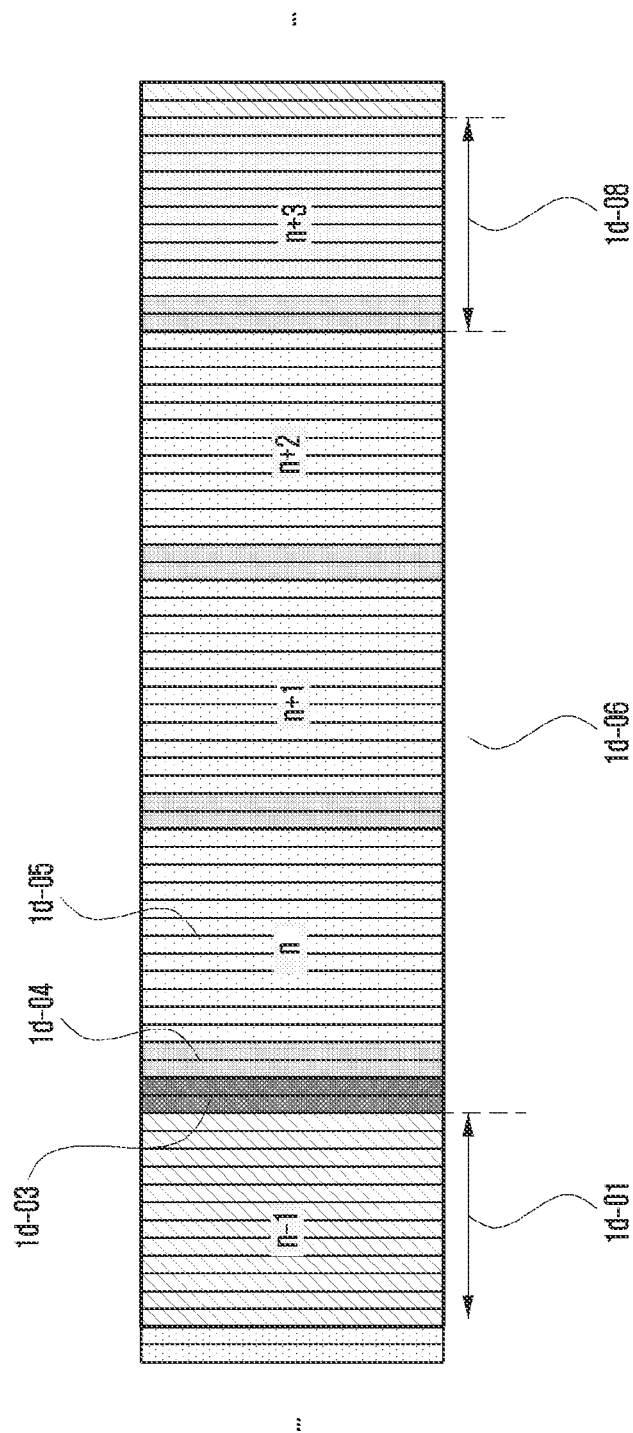
FIG. 1D illustrates a downlink channel access scheme for an unlicensed band of an LAA system.

Referring to FIG. 1D as an example, a general LAA downlink transmission operation is described as follows. The LAA cell, which performs downlink signal transmission using the unlicensed band, may perform a channel sensing operation for the unlicensed band for a time 1d-01 corresponding to a randomly selected variable period in a configured contention period. If it is determined that the unlicensed band is in an idle state through the channel sensing operation, the LAA cell may occupy the unlicensed band during the maximum channel occupation period 1d-06. Here, if the channel sensing operation is terminated before the subframe boundary or slot boundary, the LAA cell may transmit a predefined signal 1d-03 to the subframe or slot boundary to occupy the unlicensed band, and may transmit a general LTE signal (e.g., a PDCCH 1d-04, a PDSCH 1d-05, a reference signal, etc.) in a slot or subframe. Here, the last subframe in the maximum channel occupation period may be a partial subframe 1d-08 according to the start point of occupancy of the unlicensed band and the maximum channel occupation period.

Figure 1E:
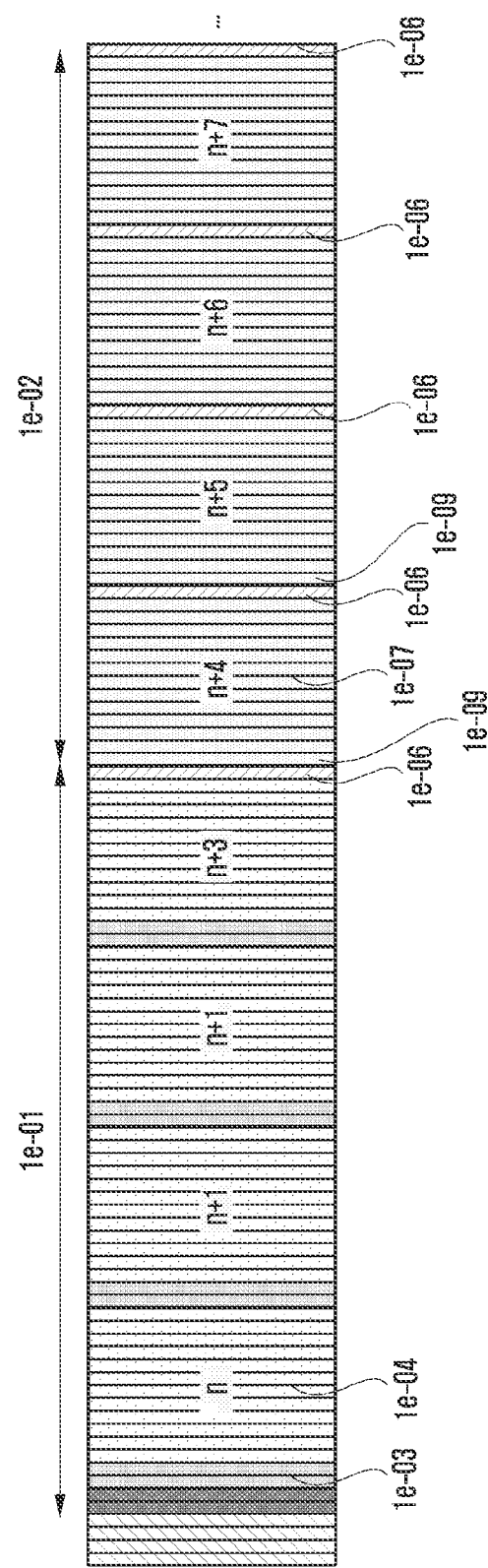
FIG. 1E illustrates an uplink channel access scheme for an unlicensed band of an LAA system.

Referring to FIG. 1E as an example, a general LAA uplink transmission operation is described as follows. The LAA terminal, which performs uplink signal transmission using an unlicensed band, may receive configuration or scheduling information about uplink transmission through UL grant or DCI transmitted through a downlink control channel 1e-03 in subframe n of a downlink transmission period 1e-01 of the LAA cell, and may perform uplink data channel transmission 1e-07 in a subframe (n+4) (k=4 in FIG. 1E) 1e-02 in which uplink transmission is configured. Here, when the uplink transmission of the LAA terminal is the uplink transmission in the unlicensed band, the LAA terminal should perform a channel sensing operation before performing the configured or scheduled uplink transmission 1e-07. Here, the channel sensing operation performed by the LAA terminal may be the same as the channel sensing operation performed by the LAA cell, or some variables (for example, a contention period size) may be different. The terminal may perform a channel sensing operation in a fixed period, and may also perform uplink transmission according to the channel sensing result. In addition, the channel sensing operation of the LAA terminal may be performed in at least one SC-FDMA symbol 1e-09 in the subframe in which uplink transmission is performed, or in at least one SC-FDMA symbol 1e-06 immediately before the configured uplink transmission subframe. Depending on the result of the channel sensing operation, the LAA terminal may perform the configured uplink transmission or not.

In the LTE system, the terminal may perform uplink data transmission according to the configuration or instruction of the base station. Transmission of an uplink data channel (hereinafter, physical uplink shared channel (PUSCH)) of the terminal is performed such that the base station indicates uplink transmission of a specific terminal through a downlink control channel (hereinafter, physical downlink control channel (PDCCH)), and the terminal transmits the configured uplink signal by using a time relationship between a previously defined uplink transmission configuration reception time (e.g., PDCCH reception time) and a configured uplink signal transmission time (e.g., PUSCH transmission time) to the base station. For example, in a case of frequency division duplex (FDD) system, when the base station instructs or schedules the terminal to perform PUSCH transmission through the PDCCH in the subframe n, the terminal performs the PUSCH transmission by using the resources configured from the base station in the subframe (n+k). Here, DCI for scheduling uplink transmission in the unlicensed band may include a field indicating a PUSCH transmission subframe, for example, a timing offset field, and when the timing offset field is included, the base station may indicate a subframe in which the PUSCH is transmitted through a timing offset field to the terminal. The terminal, which has received the DCI including the timing offset field in subframe n, may determine that the PUSCH transmission subframe is subframe (n+k) through the value (k) indicated through the timing offset field of the DCI, and may transmit the PUSCH in the subframe (n+k). Here, the PUSCH may be transmitted from the first symbol to the last symbol of the subframe (n+k).

As described above, the DCI for configuration or scheduling of uplink transmission in the unlicensed band may additionally include a field indicating a PUSCH starting position. As such, the additional indication of the PUSCH starting position is for providing time for the terminal to perform a channel sensing operation, but is not limited thereto. For example, the base station may indicate, to the terminal, the actual transmission start position in the subframe (n+k) in which the PUSCH is scheduled through a 2-bit field indicating the PUSCH starting position in the DCI for scheduling PUSCH transmission. Here, an example of a PUSCH starting position is shown in the table below. Upon receiving the DCI, the terminal may start PUSCH transmission at the indicated PUSCH transmission start time according to a value indicated by the base station through the PUSCH starting position field. For example, the terminal, which has received scheduling for PUSCH transmission in subframe (n+k) as described above, may start the PUSCH transmission from the time after 25 μs from the start time of the first symbol of the subframe (n+k) according to the value (e.g., 01) of the PUSCH starting position of the DCI. As another example, if the terminal has received an indication of 11 as the value of the PUSCH starting position of the DCI, the terminal may start the PUSCH transmission from the start time of the second symbol of the subframe (n+k).

| Value | PUSCH starting position |
| --- | --- |
| 00 | symbol 0 |
| 01 | 25 μs in symbol 0 |
| 10 | (25 + TA) μs in symbol 0 |
| 11 | symbol 1 |

Additionally, a field indicating a PUSCH ending symbol may be additionally included in the DCI for configuration or scheduling of uplink transmission in the unlicensed band as described above. As such, the additional indication of the PUSCH ending symbol is for providing time for the terminal, another terminal, or the base station to perform a channel sensing operation, but is not limited thereto. For example, the base station may indicate, to the terminal, the PUSCH transmission ending symbol in the subframe (n+k) in which the PUSCH is scheduled through a 1-bit field indicating the PUSCH ending symbol in the DCI for scheduling PUSCH transmission. Here, an example of the PUSCH ending symbol may be the last symbol of the subframe (e.g., the 14th symbol or symbol index 13) or the symbol prior to the last (e.g., the 13th symbol or symbol index 12), and the symbols may correspond to 0 and 1, which are values of the PUSCH ending symbol field, respectively. Upon receiving the DCI, the terminal may start PUSCH transmission from the indicated PUSCH transmission start time to the PUSCH ending symbol according to values indicated by the base station through the PUSCH starting position field and the field indicating the PUSCH ending symbol. For example, as described above, when the terminal scheduled for PUSCH transmission in the subframe (n+k) receives an indication of 01 as the value of the PUSCH starting position of the DC and an indication of 1 as the value of the PUSCH ending symbol, the terminal may start the PUSCH transmission from the time after 25 μs from the start time of the first symbol of the subframe (n+k) to the 13th symbol of the subframe (n+k).

As described above, a terminal, which transmits a PUSCH through the unlicensed band, may receive an indication of a PUSCH transmission start time, may perform a channel sensing operation before the transmission start time, and may transmit the entire PUSCH or not according to a result of the channel sensing operation. Here, in order to extend the PUSCH transmission opportunity of the terminal, it is possible to determine whether PUSCH transmission is possible or a PUSCH transmission start position according to the channel sensing result of the terminal. For example, as described above, it is assumed that a terminal is scheduled for PUSCH transmission in the subframe (n+k). Here, when the terminal receives an indication of 4 as the timing offset value through DCI for scheduling the PUSCH transmission, receives an indication of 01 as the value of the PUSCH starting position, and receives an indication of 1 as the value of the PUSCH ending symbol, the terminal may start the PUSCH transmission from the time after 25 μs from the start time of the first symbol of the subframe (n+k) to the 13th symbol of the subframe (n+k). If it is determined that the channel is not an idle channel as a result of the channel sensing performed at the PUSCH transmission start time (a time point immediately before 25 μs time from the start time of the first symbol of subframe (n+k)), the terminal may perform a channel sensing operation from the first symbol of the second slot among the slots configuring the subframe (n+k), the 8th symbol of the subframe n+k, or before the symbol index 7 of the subframe (n+k), and may transmit the PUSCH, according to the result of the channel sensing operation, starting from the first symbol of the second slot among the slots configuring the subframe (n+k), the 8th symbol of the subframe (n+k), or the symbol index 7 of the subframe (n+k).

Hereinafter, description as to symbol index 7 is made. Here, the UE does not perform PUSCH transmission in symbols prior to symbol index 7. This is the same as transmitting the PUSCH by puncturing a symbol and/or PUSCH prior to symbol index 7 among the PUSCHs. As described above, a PUSCH transmission mode in which PUSCH transmission of the terminal can be performed at a PUSCH transmission start time or symbol index 7 according to the channel sensing operation can be expressed as partial PUSCH mode 1, and the terminal may be configured whether to perform partial PUSCH mode through a higher layer signal (laa-PUSCH-Mode). If the partial PUSCH mode is configured from the base station, the DCI may include a field indicating the partial PUSCH mode, and the terminal may determine the PUSCH transmission start time according to the partial PUSCH mode indicated through the DCI. For example, when the partial PUSCH mode value in DCI is 0 (00 in a case of a 2-bit field), the terminal may determine the PUSCH start transmission time using the value indicated through the PUSCH start time field of the DCI, and may perform PUSCH transmission or not according to the result of the channel sensing operation which is performed before the PUSCH start transmission time. If the partial PUSCH mode value in DCI is 1 (01 in a case of a 2-bit field), the UE may determine, as the PUSCH transmission start time, one of symbol index 7 and the time indicated through the PUSCH transmission start time field of the DCI, and may perform the PUSCH transmission or not from the time indicated through the PUSCH transmission start time field according to a result of the channel sensing operation performed before the PUSCH transmission start time. If, as the result of the channel sensing operation, it is determined that the channel is not in the idle state and thus the PUSCH transmission at the time indicated through the PUSCH transmission start time field is not possible, the terminal determines that symbol index 7 is the PUSCH transmission start time and performs the channel sensing operation again before the PUSCH transmission start time. The PUSCH transmission may occur or not according to the result of the channel sensing operation.

In the LTE system, the terminal may transmit uplink control information (UCI), including the UCI type and the base station/terminal configuration according to the base station configuration or instruction based on at least one or more criteria, to the base station, by using one channel among at least one physical uplink control channel (PUCCH) and a PUSCH. Here, the UCI information may include one or more of HARQ-ACK, periodic CSI, aperiodic CSI, and scheduling request information. For example, the terminal may periodically report channel state information (CSI) to the base station through the PUCCH according to a period configured using a higher signal by the base station. If the base station requests an aperiodic CSI report from the terminal through a PDCCH, the terminal may report the CSI information measured through the PUSCH configured by the PDCCH to the base station.

In a case of a terminal, in which the uplink PUSCH transmission in the uplink subframe (n+k) is configured through a downlink control channel of the uplink subframe n from a base station, when the UCI information (e.g., at least one of periodic CSI, aperiodic CSI, HARQ-ACK, and scheduling request information) is transmitted in the subframe (n+k), the terminal may include a part of the UCI information in the configured PUSCH transmission and transmit the same to the base station. Here, a method of performing the PUSCH transmission including the UCI information is briefly shown in FIG. 1F as follows. In one uplink subframe including two slots, uplink DMRS 1f-04 is transmitted at each of SC-FDMA symbol indexes 3 and 10. When the UCI information is included in the configured PUSCH transmission and transmitted, HARQ-ACK information 1f-01 is transmitted while being included immediately on both sides of the DMRS 1f-04 symbol, and rank indicator (RI) information 1f-06 among CSI information is included on both sides of the included HARQ-ACK information 1f-01 symbol and transmitted. Here, CQI information 1f-02 excluding the RI information 1f-06 among the CSI information may be transmitted including a subcarrier having the highest frequency resource index among the configured PUSCH transmission resource regions.

Figure 1F:
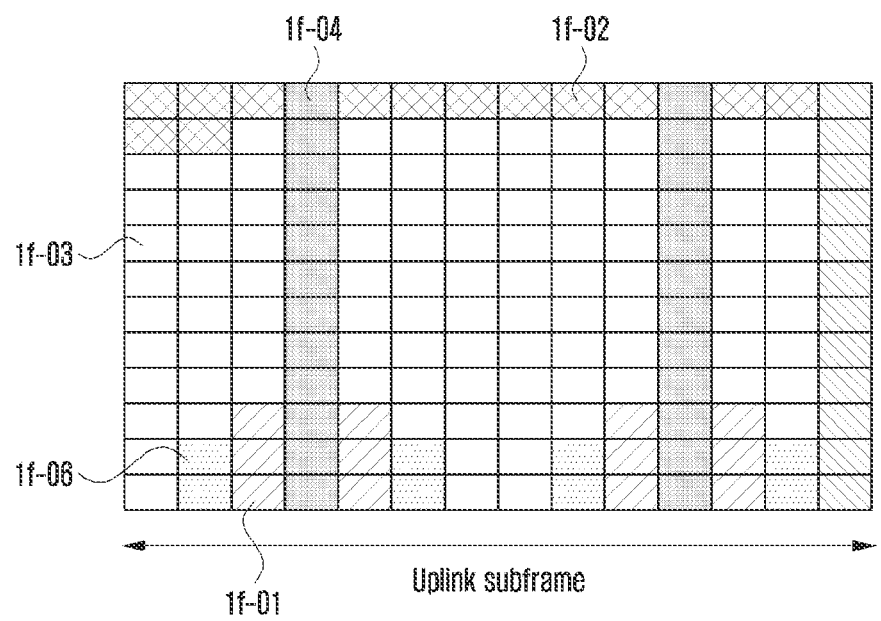
FIG. 1F illustrates a subframe structure for a case of transmission of UCI information through a PUSCH.

Here, in a case of performing transmission including UCI information in PUSCH transmitted in the unlicensed band, as described above, when a partial PUSCH mode is configured, a part of the PUSCH may not be transmitted according to a result of the channel sensing operation of the terminal. In other words, when UCI information is multiplexed on the PUSCH and transmitted as shown in FIG. 1F, some pieces of UCI may not be transmitted depending on a result of a channel sensing operation. Therefore, a terminal, in which the partial PUSCH mode is configured, requires a method in which UCI information can be transmitted regardless of the result of channel sensing operation of the terminal. In other words, a terminal in which the partial PUSCH mode is configured enables UCI information to be multiplexed at the second transmission start time of the PUSCH transmission start time or thereafter, and thus the UCI transmission may occur regardless of the result of the channel sensing operation of the terminal. In other words, in a case of a terminal in which a partial PUSCH mode is configured, or a terminal in which the partial PUSCH mode is configured is instructed to transmit the PUSCH by using the partial PUSCH mode, there is a need for a method enabling the UCI to be transmitted in the second slot of the PUSCH transmission subframe.

Accordingly, a method for multiplexing uplink data (UL-SCH) information and control information for the partial PUSCH mode is as follows.

If control information such as channel quality information and precoding matrix information is transmitted through a PUSCH of the partial PUSCH mode, uplink data (UL-SCH) information and the control information are multiplexed only in the second slot of a subframe, in which the PUSCH is transmitted, and transmitted. This will be described in more detail as follows.

As an input value for data and control information multiplexing, the coded bit of the control information is expressed as $q_0, q_1, q_2, q_3, \ldots, q_{N_L \cdot Q_{CQI}-1}$, and the coded bit of the UL-SCH is expressed as $f_0, f_1, f_2, f_3, \ldots, f_{G-1}$. Here, the output value of the UL-SCH data information is expressed as $g_0, g_1, g_2, g_3, \ldots, g_{H'-1}$. Here, $H=G$, $H'=H/(N_L \cdot Q_m)$, and $g_i$, $i=0, \ldots, H'-1$ are column vectors of length $(Q_m \cdot N_L)$. The output value of the channel quality information is expressed as $\underline{q}_0, \underline{q}_1, \ldots, \underline{q}_{Q'_{CQI}-1}$, where $\underline{q}_i$, $i=0, \ldots, Q'_{CQI}-1$ are column vectors of length $(Q_m \cdot N_L)$, and $Q'_{CQI}=Q_{CQI}/Q_m$.

In connection with UL-SCH transport block, $N_L$ is assumed to be the number of layers in which the UL-SCH transport block is transmitted, and the output value of UL-SCH data information can be obtained through the following.

Set i, k to 0
while i<G $$g_k = [f_i \ldots f_{i+Q_m \cdot N_L - 1}]^T$$

$i = i + Q_m \cdot N_L$ $k = k+1$ end while

If more than one UL-SCH transport block is transmitted, control information may be multiplexed on a UL-SCH transport block, having the highest MCS value among MCS values indicated for initial PUSCH transmission, among UL-SCH transport blocks. If two transport blocks have the same MCS value, the control information is multiplexed on the first UL-SCH transport block.

Thereafter, a channel interleaver for a case in which the PUSCH is transmitted in the partial PUSCH mode will be described.

First, the input of the channel interleaver may be denoted by $g_0, g_1, g_2, \ldots, g_{H'-1}, \underline{q}_0^{RI}, \underline{q}_1^{RI}, \underline{q}_2^{RI}, \ldots, \underline{q}_{Q'_{RI}-1}^{RI}$, and $\underline{q}_0, \underline{q}_1, \ldots, \underline{q}_{Q'_{CQI}-1}$. If two or more UL-SCH transport blocks are transmitted, HARQ-ACK and RI information may all be multiplexed on the UL-SCH transport blocks.

In the PUSCH transmission subframe, the number of modulation symbols per layer can be expressed as $H'_{total} = H' + Q'_{CQI} + Q'_{RI}$. Meanwhile, $N_{symb}^{PUSCH-initial}$ is the value obtained by excluding, from the total number of symbols configuring the subframe, the number of DM-RS symbols (or the number of symbols in the slot minus the number excluding 1, which is the number of DMRS symbols), the number of SRS symbols (or the value of 1 if SRS transmission is configured in the subframe, otherwise, the value of 0), or $N_{start}^{PUSCH-initial}$, $N_{end}^{PUSCH-initial}$. Here, $N_{start}^{PUSCH-initial}$ is 1 when the PUSCH transmission start position for the initial transmission is not the first symbol of the subframe, otherwise, $N_{start}^{PUSCH-initial}$ has the value of 0. $N_{end}^{PUSCH-initial}$ has the value of 1 when the PUSCH ending symbol for the initial transmission is the symbol prior to the last of the subframe (or the second symbol to the last or symbol index 12) and the SRS transmission symbol in the subframe is 0 (or if SRS transmission is not configured), otherwise $N_{end}^{PUSCH-initial}$ has the value of 0.

The output bit sequence from the channel interleaver can be derived as follows:

1) Assign $C_{mux} = N_{symb}^{PUSCH}$ to be the number of columns in a matrix. The column indices of the matrix are numbered $0, 1, 2, \ldots, C_{mux}-1$ from left to right.

2) The number of rows in the matrix is $R_{mux} = (H'_{total} \cdot Q_m \cdot N_L)/C_{mux}$, and is defined as $R'_{mux} = R_{mux}/(Q_m \cdot N_L)$. The row indices of the matrix are numbered $0, 1, 2, \ldots, R_{mux}-1$ from top to bottom.

3) If rank information (RI) is transmitted, the vector sequence $\underline{q}_0^{RI}, \underline{q}_1^{RI}, \underline{q}_2^{RI}, \ldots, \underline{q}_{Q'_{RI}-1}^{RI}$ is written in a column, rows $(Q_m \cdot N_L)$ starting from the last row and moving upwards according to the following pseudo-code.

Set i, j to 0.
Set r to $R'_{mux}-1$
while $i < Q'_{RI}$
if the PUSCH is partial PUSCH mode 1
   $C_{RI}$=Column Set(j+2)
else
   $C_{RI}$=Column Set(j)
end if $$y_{r \times C_{mux} C_{RI}} = \underline{q}_i^{RI}$$

$i = i+1$
if the duration of the PUSCH is subframe $r = R'_{mux} - 1 - \lfloor i/4 \rfloor$ $j = (j+3) \bmod 4$ else if the duration of the PUSCH is slot, or if the PUSCH is partial PUSCH mode 1, 2, or 3

$r = R'_{mux} - 1 - \lfloor i/2 \rfloor$ $j = (j+1) \bmod 2$ else if the duration of the PUSCH is subslot $r = R'_{mux} - 1 - i$ end if
end while Here, the column set is given according to the table below, and indices are assigned from 0 to 1 from left to right.

| CP Configuration | PUSCH Starting Position | Column Set |
|---|---|---|
| Normal | At symbol 0, or at smbol 7 | {1, 4, 7, 10} |
|  | Within symbol 0, or at symbol 1, or within symbol 7, or at symbol 8 | {0, 3, 6, 9} |

3a) If CQI/PMI information is transmitted through the PUSCH of the partial PUSCH mode, the vector sequence $q_0$, $q_1, \ldots, q_{Q'_{CQI}-1}$ is written as follows by sets of $(Q_m \cdot N_L)$ from column $y_{\lfloor C_{mux}/2 \rfloor}$ to column $y_{C_{mux}-1}$ and from row 0 to row $(Q_m \cdot N_L - 1)$ in the $(R_{mux} \times C_{mux})$ matrix. Here, the already occupied matrix entry is skipped.

$$\begin{bmatrix} y_0 & y_1 & y_2 & L & y_{C_{max}-1} \\ y_{C_{max}} & y_{C_{max}+1} & y_{C_{max}+2} & L & y_{2C_{max}-1} \\ M & M & M & O & M \end{bmatrix}$$

The pseudo-code is as follows:
Set i, k to 0.
while k<$Q'_{CQI}$,
  if $y_i$ is not assigned to RI symbols in step (3) and i mod $C_{mux} \geq \lfloor C_{mux}/2 \rfloor$,
    $y_i = q_k$
    k=k+1
  end if
  i=i+1
end while However, when UCI is mapped according to the above method (e.g., when mapping from column $y_{\lfloor C_{mux}/2 \rfloor}$ to column $y_{C_{mux}-1}$), in some cases, the UCI mapping enabling the UCI to be transmitted in the second slot of the PUSCH transmission subframe may not occur. For example, when $N_{start}^{PUSCH}=0$ and $N_{end}^{PUSCH}=1$, a case in which UCI, for example, CQI/PMI is mapped to the last symbol of the first slot (or the symbol of symbol index 6) may occur. More specifically, FIG. 1G illustrates an example in which UCI is mapped to the last symbol of the first slot when $N_{start}^{PUSCH}=0$ and $N_{end}^{PUSCH}=1$. In the above case, when considering one DM-RS symbol per slot, the number of symbols allocated to the PUSCH is 11, and thus Cmux=11. Accordingly, according to operation 3a), CQI/PMI is mapped to the PUSCH symbol index, which is from floor (Cmux/2) to Cmux−1. This refers to mapping the CQI/PMI to PUSCH symbol indexes 5 to 10, and is equivalent to mapping UCI to the last symbol of the first slot. In a case of the partial PUSCH mode, the first symbol may not be transmitted because the first symbol is punctured according to the result of the channel sensing operation of the terminal. In other words, at least one symbol of UCI cannot be transmitted. Therefore, in order to solve the above case, the following method 3b) can be used. $N_{start}^{PUSCH-initial}$ is 1 when the PUSCH transmission start position for initial transmission is not the first symbol of the subframe, and $N_{start}^{PUSCH-initial}$ is 0 otherwise.

3b) If CQI/PMI information is transmitted through the PUSCH of the partial PUSCH mode, the vector sequence $q_0$, $q_1, \ldots, q_{Q'_{CQI}-1}$ is written as follows by sets of $(Q_m \cdot N_L)$ from column $y_{C'}$ to $y_{C_{mux}-1}$ column and from row 0 to row $(Q_m \cdot N_L - 1)$ in the $(R_{mux} \times C_{mux})$ matrix. Here, the already occupied matrix entry is skipped.

$$\begin{bmatrix} y_0 & y_1 & y_2 & L & y_{C_{max}-1} \\ y_{C_{max}} & y_{C_{max}+1} & y_{C_{max}+2} & L & y_{2C_{max}-1} \\ M & M & M & O & M \end{bmatrix}$$

where $$C' = \begin{cases} \left\lfloor \frac{C_{max}}{2} \right\rfloor, & \text{if } N_{end}^{PUSCH-initial} = 0 \\ \left\lceil \frac{C_{max}}{2} \right\rceil, & \text{if } N_{end}^{PUSCH-initial} = 1 \end{cases},$$

and $N_{end}^{PUSCH-initial}$ is 1 when the PUSCH ending symbol for initial transmission is the symbol prior to the last of the subframe (or the second symbol to the last or symbol index 12) and the SRS transmission symbol in the subframe is 0 (or if SRS transmission is not configured), otherwise $N_{end}^{PUSCH-initial}$ is 0.

The pseudo-code is as follows:
Set i, k to 0.
while k<$Q'_{CQI}$,
  if $y_i$ is not assigned to RI symbols in step (3) and i mod $C_{mux} \geq \lfloor C_{mux}/2 \rfloor$,
    $y_i = q_k$
    k=k+1
  end if
  i=i+1
end while Accordingly, it is possible to map UCI 1h-02 of CQI/PMI in the second slot of the subframe as shown in FIG. 1H.

Figure 1H:
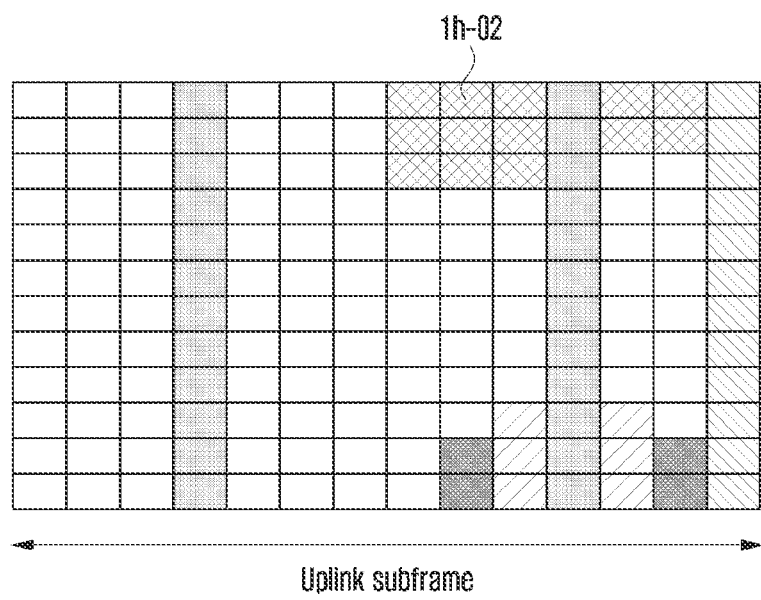
FIG. 1H illustrates a structure in which UCI information is mapped within a second slot of a PUSCH transmission subframe.

Through another method 3c), it is possible to map the UCI 1h-02 of CQI/PMI in the second slot of the subframe as shown in FIG. 1H 3c) If CQI/PMI information is transmitted through the PUSCH of the partial PUSCH mode, the vector sequence $q_0$, $q_1, \ldots, q_{Q'_{CQI}-1}$ is written as follows by sets of $(Q_m \cdot N_L)$ from column $y_{C'}$ to column $y_{C_{mux}}-1$ and from row 0 to row $(Q_m \cdot N_L - 1)$ in the $(R_{mux} \times C_{mux})$ matrix. Here, the already occupied matrix entry is skipped.

$$\begin{bmatrix} y_0 & y_1 & y_2 & L & y_{C_{max}-1} \\ y_{C_{max}} & y_{C_{max}+1} & y_{C_{max}+2} & L & y_{2C_{max}-1} \\ M & M & M & O & M \end{bmatrix}$$

where $$C' = \begin{cases} \left\lfloor \frac{C_{max}}{2} \right\rfloor, & \text{if } N_{end}^{PUSCH-initial} = 0 \\ \left\lceil \frac{C_{max}}{2} \right\rceil, & \text{if } N_{end}^{PUSCH-initial} = 1 \end{cases},$$

and $N_{end}^{PUSCH-initial}$ is 1 when the PUSCH ending symbol for initial transmission is the symbol prior to the last of the subframe (or the second symbol to the last or symbol index 12) and the SRS transmission symbol in the subframe is 0 (or if SRS transmission is not configured), otherwise $N_{end}^{PUSCH-initial}$ is 0. Here, $N_{end}^{PUSCH-initial}$ may be denoted by $N_{end}^{PUSCH}$.

The pseudo-code is as follows:
Set i, k to 0.
while k<$Q'_{CQI}$,
   if $y_i$ is not assigned to RI symbols in step (3) and i mod $C_{mux} \geq C'$
      $y_i = q_k$
      k=k+1
   end if
   i=i+1
end while Accordingly, it is possible to map the UCI 1h-02 of CQI/PMI in the second slot of the subframe as shown in FIG. 1H.

Through another method 3d), the UCI 1h-02 of CQI/PMI can be mapped in the second slot of the subframe as shown in FIG. 1H.

3d) If CQI/PMI information is transmitted through the PUSCH of partial PUSCH mode, the vector sequence $q_0, q_1, \ldots, q_{Q'_{CQI}-1}$ is written as follows by sets of $(Q_m \cdot N_L)$ from column $y_{\lfloor C_{mux}/2 \rfloor}$ to column $y_{C_{mux}-1}$ and from row 0 to row $(Q_m \cdot N_L - 1)$ in the $(R_{mux} \times C_{mux})$ matrix. Here, the already occupied matrix entry is skipped.

$$\begin{bmatrix} y_0 & y_1 & y_2 & L & y_{C_{max}-1} \\ y_{C_{max}} & y_{C_{max}+1} & y_{C_{max}+2} & L & y_{2C_{max}-1} \\ M & M & M & O & M \end{bmatrix}$$

where $$C' = \begin{cases} \left\lfloor \frac{C_{max}}{2} \right\rfloor, & \text{if } N_{start}^{PUSCH-initial} = 0 \\ \left\lceil \frac{C_{max}}{2} \right\rceil, & \text{if } N_{start}^{PUSCH-initial} = 1 \end{cases},$$

and $N_{start}^{PUSCH-initial}$ is 0 ($N_{start}^{PUSCH-initial}=0$) when the PUSCH starting position for initial transmission is started at the first symbol of the subframe, otherwise (for example, when the PUSCH starting position is after the first symbol start time of the subframe), $N_{start}^{PUSCH-initial}=1$. Here, $N_{start}^{PUSCH-initial}$ may be denoted by $N_{start}^{PUSCH}$.

The pseudo-code is as follows:
Set i, k to 0.
while k<$Q'_{CQI}$,
   if $y_i$ is not assigned to RI symbols in step (3) and i mod $C_{mux} \geq C'$
      $y_i = q_k$
      k=k+1
   end if
   i=i+1
end while Accordingly, it is possible to map UCI 1h-02 of CQI/PMI in the second slot of the subframe as shown in FIG. 1H.

Through another method 3e), it is possible to map the UCI 1h-02 of CQI/PMI in the second slot of the subframe as shown in FIG. 1H.

3e) If CQI/PMI information is transmitted through the PUSCH of partial PUSCH mode, the vector sequence $q_0, q_1, \ldots, q_{Q'_{CQI}-1}$ is written as follows by sets of $(Q_m \cdot N_L)$ from column $y_{C'}$ to column $y_{C_{mux}-1}$ and from row 0 to row $(Q_m \cdot N_L - 1)$ in the $(R_{mux} \times C_{mux})$ matrix. Here, the already occupied matrix entry is skipped.

$$\begin{bmatrix} y_0 & y_1 & y_2 & L & y_{C_{max}-1} \\ y_{C_{max}} & y_{C_{max}+1} & y_{C_{max}+2} & L & y_{2C_{max}-1} \\ M & M & M & O & M \end{bmatrix}$$

Here, $C' = \tilde{N}_{symb}^{UL}/2 - N_{start}^{PUSCH-initial}$, and $\tilde{N}_{symb}^{UL}$ is the number of symbols excluding one DM-RS symbol in the subframe, or the sum of the remaining symbols $\tilde{N}_{symb}^{UL}=2$ ($N_{symb}^{UL}-1$) after excluding one DM-RS symbol from the number of symbols $N_{symb}^{UL}$ in each slot configuring the subframe. $N_{start}^{PUSCH-initial}$ is 0 ($N_{start}^{PUSCH-initial}=0$) when the PUSCH starting position for initial transmission is started at the first symbol of the subframe, otherwise (for example, when the PUSCH starting position is after the first symbol start time of the subframe), $N_{start}^{PUSCH-initial}=1$. Here, $N_{start}^{PUSCH-initial}$ may be denoted by $N_{start}^{PUSCH}$.

The pseudo-code is as follows:
Set i, k to 0.
while k<$Q'_{CQI}$,
   if $y_i$ is not assigned to RI symbols in step (3) and i mod $C_{mux} \geq C'$
      $y_i = q_k$
      k=k+1
   end if
   i=i+1
end while Accordingly, it is possible to map UCI 1h-02 of CQI/PMI in the second slot of the subframe as shown in FIG. 1H.

(4) Write the input vector sequence, i.e., sets of rows $(Q_m \cdot N_L)$ from vector $y_0$ in column 0 and row 0 to $(Q_m \cdot N_L - 1)$ into the $(R_{mux} \times C_{mux})$ matrix. The already occupied/written entries among the matrix entries are skipped.

$$\begin{bmatrix} y_0 & y_1 & y_2 & \cdots & y_{C_{max}-1} \\ y_{C_{max}} & y_{C_{max}+1} & y_{C_{max}+2} & \cdots & y_{2C_{max}-1} \\ \vdots & \vdots & \vdots & \ddots & \vdots \\ y_{(R'_{max}-1) \times C_{max}} & y_{(R'_{max}-1) \times C_{max}+1} & y_{(R'_{max}-1) \times C_{max}+2} & \cdots & y_{(R'_{max} \times C_{max}-1)} \end{bmatrix}$$

The pseudo code is as follows:
Set i, k to 0.
while k<H',
   if $y_i$ is not assigned to RI symbols, or CQI/PMI symbols in step (3a), or AUL-UCI symbols in step (3b)
      $y_i = g_k$
      k=k+1
   end if
   i=i+1
end while (5) Since HARQ-ACK information is not transmitted for PUSCH transmission through the partial PUSCH mode, a process for transmission of HARQ-ACK information is omitted.

(6) The output value of the block interleaver is a bit sequence in which the $(R_{mux} \times C_{mux})$ matrix is read in units of columns. Bits after the channel interleaving are expressed as $h_0, h_1, h_2, \ldots, h_{H+N_L \cdot Q_{RI}-1}$, where $N_L$ is the number of layers of the UL-SCH transport block to which the UCI is mapped.

Through the above process, in a case of multiplexing UCI to PUSCH transmitted according to the partial PUSCH mode and transmitting the same, for example, a terminal, which has been requested to report aperiodic CSI through an unlicensed band cell, enables the UCI to be transmitted in the second slot of the PUSCH transmission subframe, and thus the UCI transmission can be correctly performed regardless of the result of channel occupation operation of the terminal.

Figure 1I:
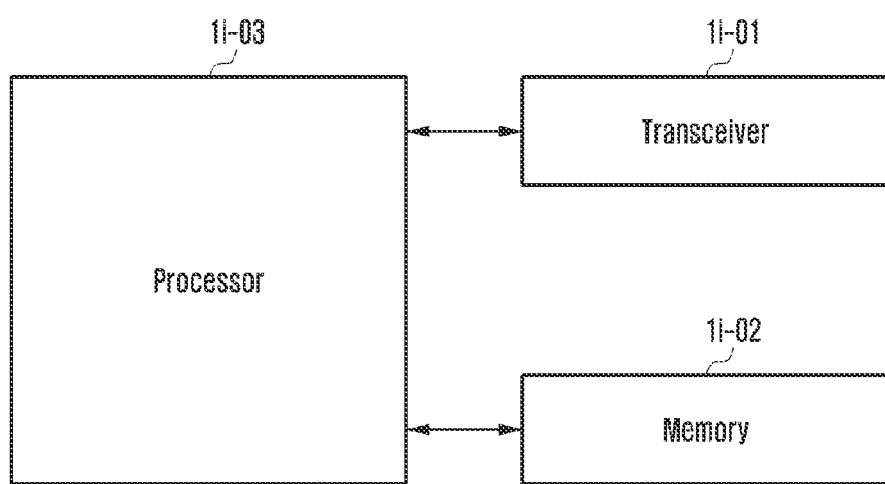
FIG. 1I is a block diagram of a UE according to an embodiment.

FIG. 1I illustrates a structure of a UE according to an embodiment.

Referring to FIG. 1I, the UE may include a transceiver 1*i*-1, a memory 1*i*-02, and a processor 1*i*-03. However, the components of the UE are not limited to the above-described examples. For example, the UE may include more or fewer components than the aforementioned components. In addition, the transceiver 1*i*-01, the memory 1*i*-02, and the processor 1*i*-03 may be implemented in the form of a single chip.

According to an embodiment, the transceiver 1*i*-01 may transmit/receive a signal to/from the base station. The above-described signal may include control information and data. To this end, the transceiver 1*i*-01 may include an RF transmitter for up-converting and amplifying a frequency of a transmitted signal, and an RF receiver for low-noise amplifying and down-converting a received signal. In addition, the transceiver 1*i*-01 may receive a signal through a wireless channel and output the signal to the processor 1*i*-03, and transmit the signal output from the processor 1*i*-03 through a wireless channel.

The memory 1*i*-02 may store programs and data necessary for the operation of the UE. In addition, the memory 1*i*-02 may store control information or data included in a signal transmitted and received by the UE. The memory 1*i*-02 may be configured as a storage medium or a combination of storage media, such as ROM, RAM, hard disk, CD-ROM, and DVD. In addition, the memory 1*i*-02 may be composed of a plurality of memories.

The processor 1*i*-03 may control a series of processes, operations, or steps in which the UE may operate according to the above-described embodiments.

In addition, the processor 1*i*-03 may include a plurality of processors, and by executing a program stored in the memory 1*i*-02, embodiments of the disclosure may be performed.

Figure 1J:
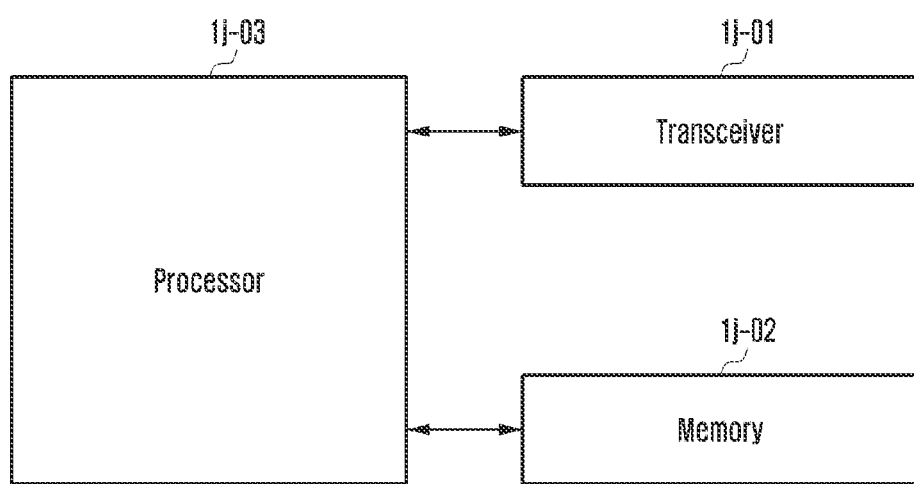
FIG. 1J is a block diagram of a base station according to an embodiment.

FIG. 1J illustrates a structure of a base station according to an embodiment.

Referring to FIG. 1J, the base station may include a transceiver 1*j*-01, a memory 1*j*-02, and a processor 1*j*-03. However, the components of the base station are not limited to the above-described examples. For example, the base station may include more or fewer components than the aforementioned components. In addition, the transceiver 1*j*-01, the memory 1*j*-02, and the processor 1*j*-03 may be implemented in the form of a single chip.

The transceiver 1*j*-01 may transmit/receive a signal to/from the UE. The above-described signal may include control information and data. To this end, the transceiver 1*j*-0*l* may include an RF transmitter for up-converting and amplifying a frequency of a transmitted signal, and an RF receiver for low-noise amplifying and down-converting a received signal. In addition, the transceiver 1*j*-01 may receive a signal through a wireless channel and output the signal to the processor 1*j*-03, and transmit the signal output from the processor 1*j*-03 through a wireless channel.

The memory 1*j*-02 may store programs and data necessary for the operation of the base station. In addition, the memory 1*j*-02 may store control information or data included in a signal transmitted and received by the base station. The memory 1*j*-02 may be configured as a storage medium or a combination of storage media, such as ROM, RAM, hard disk, CD-ROM, and DVD. In addition, the memory 1*j*-02 may be composed of a plurality of memories.

The processor 1*j*-03 may control a series of processes in which the base station may operate according to the above-described embodiments.

In addition, the processor 1*j*-03 may include a plurality of processors, and by executing a program stored in the memory 1*j*-02, embodiments of the disclosure may be performed.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a communication system, the method comprising:

receiving, from a base station, downlink control information (DCI) scheduling a physical uplink shared channel (PUSCH) in a licensed-assisted access (LAA) cell;

identifying that the PUSCH is associated with a partial PUSCH mode; and transmitting, to the base station, the PUSCH including channel quality information (CQI) in a subframe, the CQI being transmitted only on a second slot of the subframe, wherein the CQI is mapped to a symbol in the second slot of the subframe based on a first parameter associated with a number of symbols in an uplink slot and a second parameter associated with a starting position of the PUSCH in the subframe.

2. The method of claim 1, further comprising:

identifying a vector sequence for the CQI as an input of a channel interleaver; and mapping the vector sequence to a channel interleaving matrix, wherein a column index to which the vector sequence is mapped in the channel interleaving matrix is greater than or equal to a value determined based on the first parameter and the second parameter.

3. The method of claim 2, wherein the value C' is determined as $$C'=\tilde{N}_{symb}^{UL}/2-N_{start}^{PUSCH},$$

where:

$\tilde{N}_{symb}^{UL}=2(N_{symb}^{UL}-1)$, $N_{symb}^{UL}$ is the number of symbols in the uplink slot, and $N_{start}^{PUSCH}$ is 0 or 1 depending on the starting position of the PUSCH in the subframe.

4. The method of claim 1, wherein the PUSCH further includes rank indication (RI) information and uplink shared channel (UL-SCH) data, and wherein the RI information is transmitted only on the second slot of the subframe.

5. The method of claim 1, further comprising:

receiving, from the base station, information configuring the partial PUSCH mode by higher layer signaling; and receiving, from the base station, an information field indicating the PUSCH is associated with the partial PUSCH mode in the DCI.

6. A terminal in a communication system, the terminal comprising:
a transceiver; and
a processor configured to:
receive, from a base station, downlink control information (DCI) scheduling a physical uplink shared channel (PUSCH) in a licensed-assisted access (LAA) cell;
identify that the PUSCH is associated with a partial PUSCH mode; and
transmit, to the base station, the PUSCH including channel quality information (CQI) in a subframe, the CQI being transmitted only on a second slot of the subframe,
wherein the CQI is mapped to a symbol in the second slot of the subframe based on a first parameter associated with a number of symbols in an uplink slot and a second parameter associated with a starting position of the PUSCH in the subframe.

7. The terminal of claim 6, wherein the processor is further configured to:
identify a vector sequence for the CQI as an input of a channel interleaver; and
map the vector sequence to a channel interleaving matrix, wherein a column index to which the vector sequence is mapped in the channel interleaving matrix is greater than or equal to a value determined based on the first parameter and the second parameter.

8. The terminal of claim 7, wherein the value C' is determined as $$C' = \tilde{N}_{symb}^{UL}/2 - N_{start}^{PUSCH},$$

where:
$\tilde{N}_{symb}^{UL} = 2(N_{symb}^{UL} - 1)$, $N_{symb}^{UL}$ is the number of symbols in the uplink slot, and
$N_{start}^{PUSCH}$ is 0 or 1 depending on the starting position of the PUSCH in the subframe.

9. The terminal of claim 6, wherein the PUSCH further includes rank indication (RI) information and uplink shared channel (UL-SCH) data, and
wherein the RI information is transmitted only on the second slot of the subframe.

10. The terminal of claim 6, wherein the processor is further configured to:
receive, from the base station, information configuring the partial PUSCH mode by higher layer signaling; and
receive, from the base station, an information field indicating the PUSCH is associated with the partial PUSCH mode in the DCI.

11. A method performed by a base station in a communication system, the method comprising:
transmitting, to a terminal, downlink control information (DCI) scheduling a physical uplink shared channel (PUSCH) in a licensed-assisted access (LAA) cell; and
receiving, from the terminal, the PUSCH associated with a partial PUSCH mode and including channel quality information (CQI) in a subframe, the CQI being received only on a second slot of the subframe,
wherein the CQI is mapped to a symbol in the second slot of the subframe based on a first parameter associated with a number of symbols in an uplink slot and a second parameter associated with a starting position of the PUSCH in the subframe.

12. The method of claim 11, wherein a vector sequence for the CQI is mapped to a channel interleaving matrix, and
wherein a column index to which the vector sequence is mapped in the channel interleaving matrix is greater than or equal to a value determined based on the first parameter and the second parameter.

13. The method of claim 12, wherein the value C' is determined as $$C' = \tilde{N}_{symb}^{UL}/2 - N_{start}^{PUSCH},$$

where:
$\tilde{N}_{symb}^{UL} = 2(N_{symb}^{UL} - 1)$, $N_{symb}^{UL}$ is the number of symbols in the uplink slot, and
$N_{start}^{PUSCH}$ is 0 or 1 depending on the starting position of the PUSCH in the subframe.

14. The method of claim 11, wherein the PUSCH further includes rank indication (RI) information and uplink shared channel (UL-SCH) data, and
wherein the RI information is received only on the second slot of the subframe.

15. The method of claim 11, further comprising:
transmitting, to the terminal, information configuring the partial PUSCH mode by higher layer signaling; and
transmitting, to the terminal, an information field indicating the PUSCH is associated with the partial PUSCH mode in the DCI.

16. A base station in a communication system, the base station comprising:
a transceiver; and
a processor configured to:
transmit, to a terminal, downlink control information (DCI) scheduling a physical uplink shared channel (PUSCH) in a licensed-assisted access (LAA) cell; and
receive, from the terminal, the PUSCH associated with a partial PUSCH mode and including channel quality information (CQI) in a subframe, the CQI being received only on a second slot of the subframe,
wherein the CQI is mapped to a symbol in the second slot of the subframe based on a first parameter associated with a number of symbols in an uplink slot and a second parameter associated with a starting position of the PUSCH in the subframe.

17. The base station of claim 16, wherein a vector sequence for the CQI is mapped to a channel interleaving matrix, and
wherein a column index to which the vector sequence is mapped in the channel interleaving matrix is greater than or equal to a value determined based on the first parameter and the second parameter.

18. The base station of claim 17, wherein the value C' is determined as $$C' = \tilde{N}_{symb}^{UL}/2 - N_{start}^{PUSCH},$$

where:
$\tilde{N}_{symb}^{UL} = 2(N_{symb}^{UL} - 1)$, $N_{symb}^{UL}$ is the number of symbols in the uplink slot, and
$N_{start}^{PUSCH}$ is 0 or 1 depending on the starting position of the PUSCH in the subframe.

19. The base station of claim 16, wherein the PUSCH further includes rank indication (RI) information and uplink shared channel (UL-SCH) data, and
wherein the RI information is received only on the second slot of the subframe.

20. The base station of claim 16, wherein the processor is further configured to:
transmit, to the terminal, information configuring the partial PUSCH mode by higher layer signaling; and
transmit, to the terminal, an information field indicating the PUSCH is associated with the partial PUSCH mode in the DCI.

* * * * *